United States Patent
Miyake et al.

(10) Patent No.: US 7,505,412 B2
(45) Date of Patent: Mar. 17, 2009

(54) TRANSMISSION CONTROL METHOD AND SYSTEM

(75) Inventors: Motoharu Miyake, Yokosuka (JP);
Hiroshi Inamura, Yokohama (JP);
Osamu Takahashi, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 787 days.

(21) Appl. No.: 10/744,960

(22) Filed: Dec. 22, 2003

(65) Prior Publication Data

US 2004/0190540 A1 Sep. 30, 2004

(30) Foreign Application Priority Data

Dec. 27, 2002 (JP) ............... 2002-382222

(51) Int. Cl.
*H04L 12/26* (2006.01)
*H04L 12/56* (2006.01)

(52) U.S. Cl. ...................... 370/236; 370/394

(58) Field of Classification Search .......... 370/229–235
See application file for complete search history.

(56) References Cited

U.S. PATENT DOCUMENTS

| | | | | |
|---|---|---|---|---|
| 4,839,891 A | * | 6/1989 | Kobayashi et al. | 370/231 |
| 5,245,616 A | * | 9/1993 | Olson | 714/748 |
| 6,493,316 B1 | * | 12/2002 | Chapman et al. | 370/231 |
| 6,901,081 B1 | * | 5/2005 | Ludwig | 370/519 |

2002/0165973 A1 11/2002 Baker et al.

FOREIGN PATENT DOCUMENTS

WO    WO 01/97438 A2   12/2001

OTHER PUBLICATIONS

Ludwig, R. et al., "The Eifel Detection Algorithm for TCP", Jul. 24, 2002, 10 pages.
Allman M. et al., "On Estimating End-to-End Network Path Properties" *ACM SIGCOMM Computer Communication Review*, vol. 29, Issue 4, Oct. 1999, pp. 263-274.
Floyd, S. et al., "rfc 2582: The NewReno Modification to TCP's Fast Recovery Algorithm", *Network Working Group Request for Comments*, 1999, 10 pages.
Byung-gon, Chun et al., "Auxiliary timeout and selective packet discard schemes to improve TCP performance in PCN environment", *Communications, ICC '97 Montreal, Towards the Knowledge Millenium., 1997 IEEE International Conference on Montreal*, Jun. 1997, pp. 381-385.
Sarolahti, P. et al., "F-RTO: A New Recovery Algorithm for TCP Retransmission Timeouts", *University of Helsinki*, Technical Report C2002-07, Feb. 2002, 22 pages.

* cited by examiner

*Primary Examiner*—Kwang B Yao
*Assistant Examiner*—Juvena Loo
(74) *Attorney, Agent, or Firm*—Brinks Hofer Gilson & Lione

(57) ABSTRACT

Upon receiving an acknowledgement after retransmission of a data segment, an acknowledgement number contained in the acknowledgement is compared with an acknowledgment number expected to be contained in an acknowledgement pertaining to the retransmitted data segment. When the former is larger than the latter, it is determined that the acknowledgement pertains to a data segment that was originally transmitted.

20 Claims, 12 Drawing Sheets

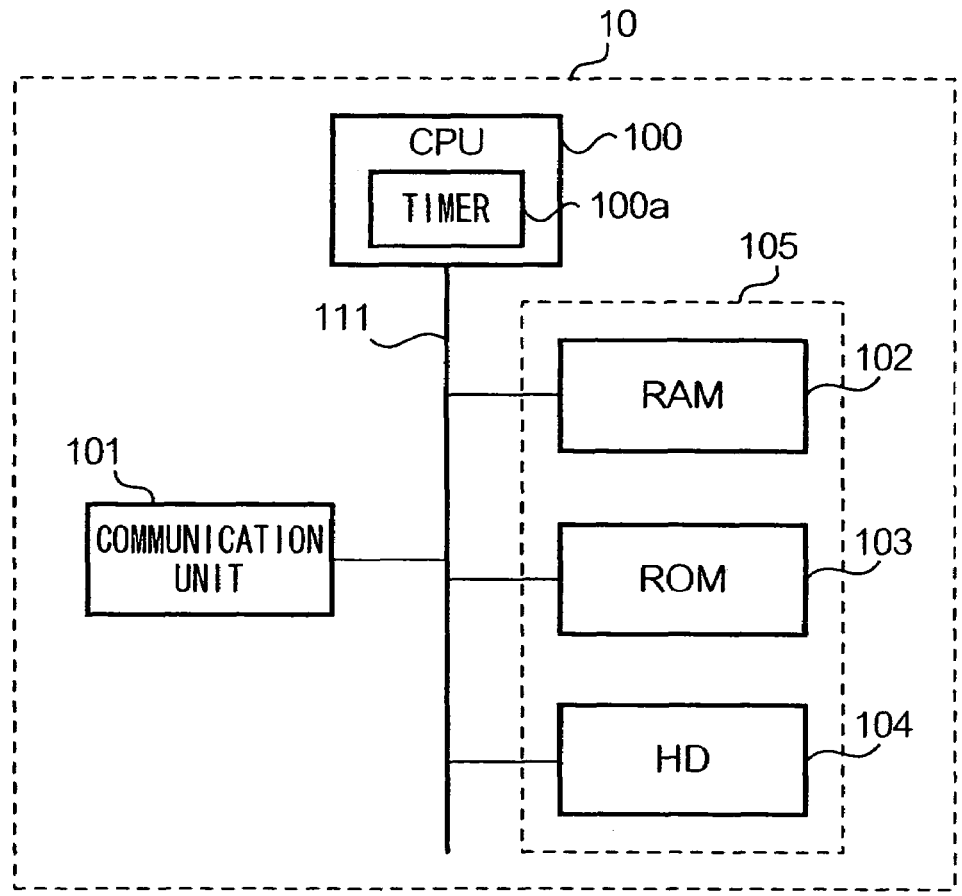

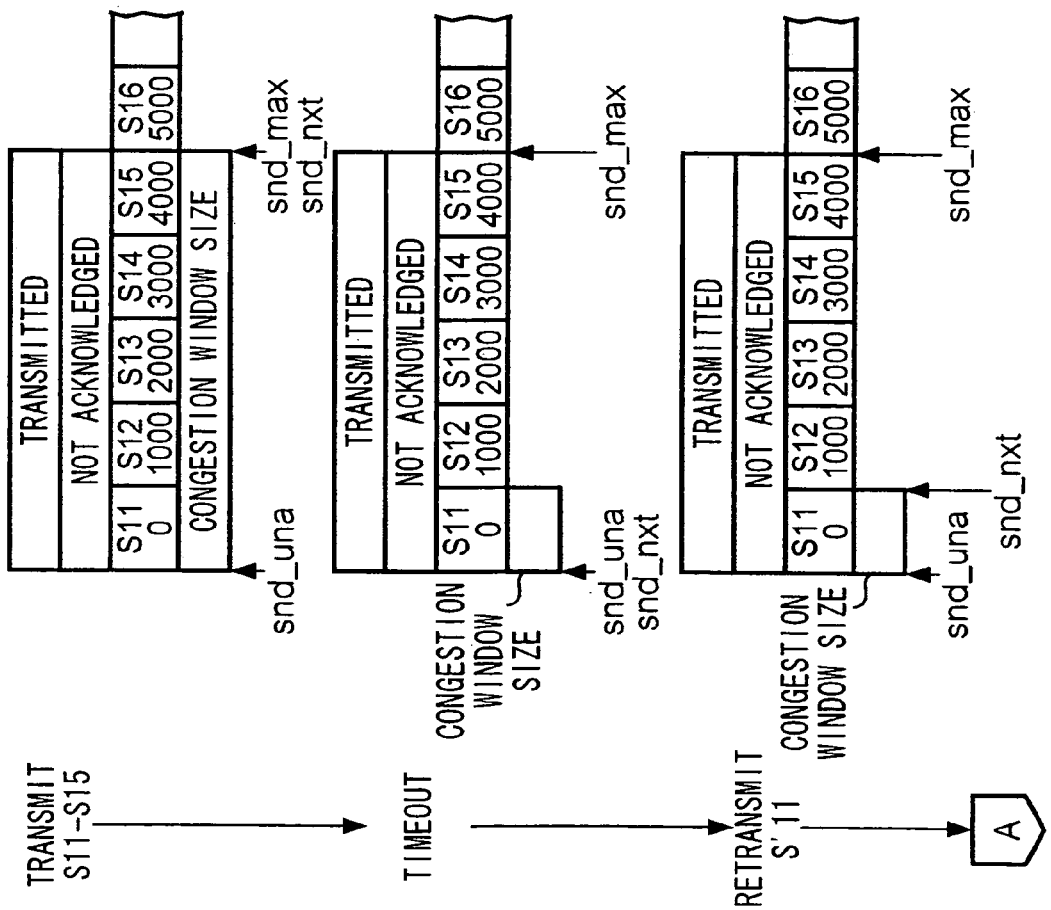

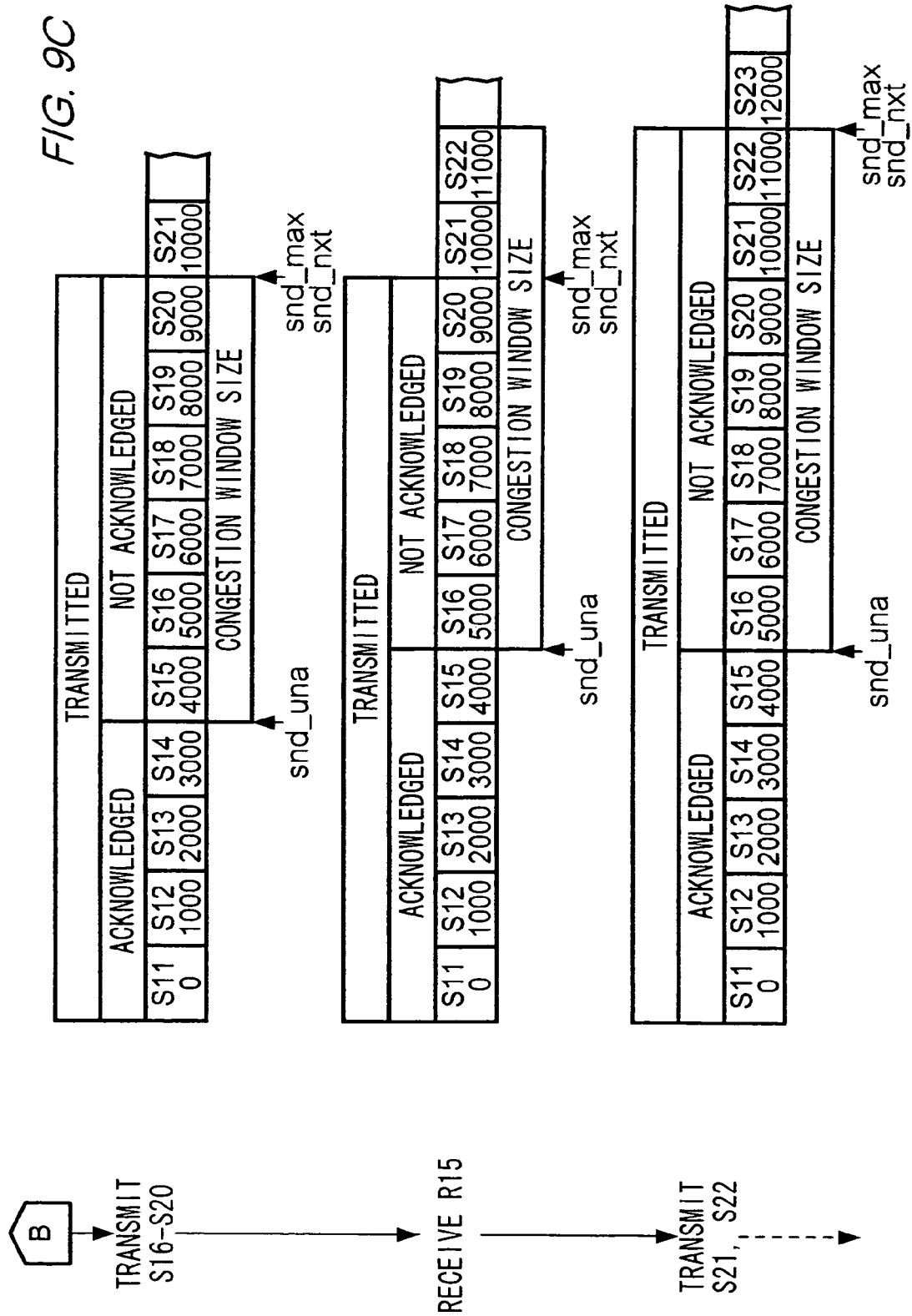

TRANSMISSION CONTROL METHOD AND SYSTEM

TECHNICAL FIELD

The invention relates to a technique for controlling retransmission of data in a communication network.

BACKGROUND ART

Devices that use TCP (Transmission Control Protocol) for transmitting and receiving data are now commonly employed. TCP is a protocol used under the OSI (Open Systems Interconnection) Reference Model, and is used when data streamed from an upper layer are divided into data segments for transmission from a sender device to a receiver device. TCP ensures reliable streaming of ordered data segments to a receiver device. Specifically, a number (hereinafter referred to as "a sequence number") is allocated to each data segment in a data sequence to indicate an order of the data segment in the data sequence. A sender device allocates a sequence number to a header of each data segment to be transmitted, and also initializes a timer when the data segment is transmitted. If there is no acknowledgement from the receiver device of receipt of a transmitted data segment within a projected time (Timeout), the time being determined on the basis of an estimated time for transmission of the data segment to its reception, and acknowledgement of its receipt (i.e., estimated round trip time of the data segment), the sender device tentatively determines that the data segment has been lost without reaching the receiver device and retransmits the data segment to the receiver device.

At a sender device, when an acknowledgement is received, a number contained in a header of the received acknowledgement indicates which data segment the received acknowledgement corresponds to. When the receiver device transmits an acknowledgement it sets a sequence number of a data segment which it expects to receive next in the "acknowledgement number" field in the header of the acknowledgement. For instance, when using sequence numbers starting from 500 and followed by 1000, 1500 etc., an acknowledgement number of an acknowledgement to be transmitted to a sender device is set as 1000 once a data segment having a sequence number "500" is received. Upon receiving such an acknowledgment, the sender device determines that a transmitted data segment has been safely received by a receiver device and transmits a subsequent data segment.

It is to be noted that a sender device receives an acknowledgment having an acknowledgment number 1000 where the sender device has not transmitted a data segment having a sequence number 1000, or where even if the data segment has been transmitted, the segment has not been received by a receiver device. This acknowledgement number remains set at 1000 until a data segment containing a sequence number 1000 is received at the receiver device even where a subsequent data segment having a sequence number 1500 is already received at a receiver device due to a loss of the data segment having a sequence number 1000. Thus, a sequence number of the least recent data segment which is not received by a receiver device is set as an acknowledgement number.

In the data segment transmission method explained above, reliability is ensured by transmitting from a sender device a subsequent data segment only after receipt at the device from a receiver device of an acknowledgement for a previously transmitted data segment. However, while this method ensures data transmission reliability it inhibits efficiency. To improve efficiency, TCP provides a method for transmitting a certain number of data segments according to a number defined by a "window." A "window" is a number of bytes or a number of data segments that can be transmitted prior to receipt of an acknowledgement. A window size is determined by a sender device such that it does not exceed an available buffer size of a receiver device. When a sender device receives an acknowledgement for a transmitted data segment(s), a window slides by the number of data segments for which an acknowledgement has been received, and a subsequent data segment(s) is transmitted to the extent by which a window has slid. This method is referred to as a "sliding window method"; and by controlling a window size, a data flow is controlled.

If data flow is suspended when a sliding window method is being employed, due to, for example, a break in wireless communication or congestion in a system, transmitted data segments may either be lost in the system or need to be stored temporarily in a node in the network until data communication is restored. Especially, deterioration is more likely to happen in a wireless communication environment. Following restoration of data communication, any data segments that are temporarily stored in a node in the network are able to reach the receiver device, although with some delay.

However, if communication disruption persists for a relatively long time, and a timeout occurs at a sender device for a transmitted data segment, the sender device retransmits a first data segment from among data segments that have thus far been transmitted but that have not been acknowledged. As a result, the receiver device receives both the data segment temporarily stored in the network (hereinafter referred to as "an original data segment") and the retransmitted data segment. The receiver device then returns an acknowledgement for the original data segment upon its receipt, and also transmits an acknowledgement for the retransmitted data segment upon its receipt; with each of these acknowledgments normally having the same acknowledgment number. This gives rise to a problem that the sender device is unable to determine whether an acknowledgment received pertains to an originally transmitted or to a retransmitted data segment, and reverts to a state where it is determined that the original data segment failed to reach the receiver device.

In the following two examples, explanation will be given for such a situation.

FIG. 10 is an example sequence diagram showing a case where a packet communication is performed between a server device 10' (a sender device) and a client device 50 (a receiver device). A 4-digit-number appearing to the right of an initial point of each arrow at server device 10' in the figure is a sequence number of a data segment transmitted from server device 10'; and a 4-digit-number appearing to the left of an initial point of each arrow at receiver device 50 in the figure is an acknowledgement number included in an acknowledgement transmitted from client device 50. It is assumed here that an original sliding window size is three, i.e., three data segments may be sent without receiving an acknowledgement.

In FIG. 10, three data segments (original data segments) S1-S3 are transmitted for a first time from server device 10', the data segments S1, S2, and S3 having sequence numbers 0, 1000, and 2000, respectively. A timer is set at server device 10' upon transmission of the data segments.

In the figure, the data segments S1, S2, and S3 are received at client device 50 with a delay due to deterioration in network communication conditions. Client device 50, upon receiving the original data segment S1, transmits to server device 10' an acknowledgement RI having acknowledgment number 1000. Likewise, upon receiving original data segment S2, client device 50 transmits an acknowledgement R2 having acknowledgment number 2000, and an acknowledgement R3 having acknowledgment number 3000 upon receiving original data segment S3.

As shown in the figure, server device 10' does not receive an acknowledgment from receiver device 50 before an elapsed time measured by a timer exceeds a timeout value. As a result, server device 10' determines that the original data segment S1 has not been received by client device 50 at the time of timeout, and retransmits a data segment having sequence number 0 (retransmitted data segment S'1). One data segment, i.e., retransmitted data segment S'1, is transmitted here because a window size is reduced to a minimum value upon timeout.

Server device 10' subsequently receives an acknowledgement R1 having an acknowledgement number 1000. Here, server device 10' is unable to determine on the basis of the acknowledgement number 1000 whether the acknowledgement R1 pertains to original data segment S1 or to retransmitted data segment S'1, for the reason stated above. Therefore, server device 10' treats acknowledgement R1 as pertaining to retransmitted data segment S'1, and a data segment having sequence number 1000 is therefore retransmitted (retransmitted data segment S'2). Server device 10' further retransmits a data segment having a subsequent sequence number 2000 (retransmitted data segment S'3) because the window size is increased by one after receiving the acknowledgement R1.

Server device 10' subsequently receives an acknowledgement R2 having an acknowledgement number 2000, and subsequent original data segments (original data segment S4 and following original data segments) are sequentially transmitted.

In the example, original data segments S2 and S3 are retransmitted (retransmitted data segments S'2 and S'3) even though they have safely arrived at client device 50. That is, when data segments S2 and S3 are each received by client device 50 at two different times, the retransmission of data segments S2 and S3 results in unnecessary transmission, although this was not determined at the time of the retransmission. Further, as is clear from FIG. 10, acknowledgements R'2 and R'3 are also transmitted in response to the retransmitted data segments S'2 and S'3. Thus, a total of four data segments are unnecessarily retransmitted.

FIG. 11 shows a second example of where unnecessary retransmission of data segments may take place. To prevent a receiver device from transmitting an excessive number of acknowledgements, TCP provides that transmission of an acknowledgement from a receiver device may be delayed within a prescribed time, and that the acknowledgement may be transmitted together with a next data transmission from the receiver device ("Delayed Acknowledgement", RFC 2581). However, in a case of receiving two full-size data segments in a row within a prescribed time, an acknowledgement should be transmitted without waiting for a next data transmission. That is, in a case that two data segments are received within a short time lag, for example within 200 msec (millisecond) of each other, an acknowledgement informing receipt of the two data segments can be substituted by use of a single acknowledgement. Specifically, a receiver device transmits an acknowledgement for the second received data segment thereby informing a sender device of receipt of the two data segments. This is the case in the example shown in FIG. 11.

In FIG. 11, the original data segments S1, S2, and S3 are transmitted from server device 10' and received subsequently by client device 50 with some delay due to deterioration in the communication path, as assumed in the case of FIG. 10. Subsequently, client device 50 transmits an acknowledgement R2. In the meantime, server device 10' retransmits data segment S1 (retransmitted data segment S'1) due to the timeout. One data segment, i.e., retransmitted data segment S'1, is transmitted here because a window size is reduced to a minimum value upon timeout.

Server device 10' subsequently receives the acknowledgement R2 transmitted from client device 50. Upon receipt, server device 10' refers to acknowledgement number 2000 contained in acknowledgement R2, and retransmits a segment having the same sequence number, i.e., the original data segment S3. Server device 10' further transmits a subsequent original data segment S4 having sequence number 3000 because the window size is increased by one data segment by receiving the acknowledgement R2.

Server device 10' subsequently receives an acknowledgement R3 having acknowledgement number 3000 transmitted from client device 50. As a result, server device 10' sequentially transmits an original data segment S5 having a subsequent sequence number 4000 and following data segments.

In this example, the original data segment S3 is retransmitted even though the segment S3 has been safely received by client device 50 in actuality; and as shown in FIG. 11 an acknowledgement R'3 for the retransmitted data segment S'3 is also transmitted. Thus, the retransmission of data segment S'3 and the acknowledgement R'3 constitute unnecessary transmission.

Such unnecessary transmission of data segments is not performed if it is determined that an acknowledgement received after retransmission of a data segment pertains to an original data segment in a case where a sender device is unable to determine whether the acknowledgement pertains to the original data segment or the retransmitted data segment.

However, when such a determination is made, an acknowledgment for a retransmitted data segment is regarded as an acknowledgement for an original data segment, wherein a window is slid forwards, causing a subsequent original data segment to be transmitted. When such a transmission of an original data segment is repeated, there is a risk of a cumulative increase in the number of data segments that have been transmitted from server device 10' but that have not reached client device 50 being increased.

To avoid such a risk, it is determined by default that an acknowledgement pertains to an original data segment in a case where a sender device is unable to determine whether the acknowledgement pertains to the original data segment or a retransmitted data segment. However, using this determination, a sender device is unable to avoid unnecessary retransmission of a data segment.

To solve this problem, "The Eifel Detection Algorithm for TCP" (Reiner Ludwig, et. al, http://www.watersprings.org/pub/id/draft-ietf-tsvwg-tcp-eifel-alg-04.txt, 24 Jul., 2002) discloses a technique for enabling reliable determination as to whether an acknowledgment pertains to an original data segment or to a retransmitted data segment by using the TCP Time Stamps Option defined in RFC 1323.

Also, in "On Estimating End-To-End Network Path Properties. 2.8 Impact of Bad Timeouts" (Mark Allman, Vern Paxson, ACM SIGCOMM '99, vol.29, no.4, pp 263-274, Oct. 1999), Allman et. al proposes a technique for using statistical information to estimate whether a received acknowledgment pertains to an original data segment or to a retransmitted data segment in packet communication in a wired packet communication network.

In the Allman's proposal, estimation is performed on the basis of ½ of a minimum round trip time as a threshold value, where the minimum round trip time is the smallest value of a plurality of round trip times obtained by measuring a time from which a data segment is transmitted until a time when an acknowledgment for the segment is received while a connection remains alive between a sender device and a receiver device. In the method, if a time which elapses from retransmission of a data segment until a time when a first acknowledgement is received is equal to or longer than (or longer than) the threshold value, the acknowledgement received is regarded as pertaining to the retransmitted data segment, with the elapsed time being less than (or equal to or less than) the threshold value, while the acknowledgment received is regarded as pertaining to the original data segment.

Determination of the threshold time as being a half that of a minimum round trip time is based on the following conditions:

1. Statistically, a probability of an acknowledgement being received for an originally transmitted data segment is about the same during: a period from retransmission until ½ of a minimum round trip time has elapsed; a period from retransmission until ¾ of a minimum round trip time has elapsed; and a period from retransmission until the complete minimum round trip time has elapsed; and 2. Statistically, a probability of receiving an acknowledgement for a retransmitted data segment sharply increases about a time point shortly after ½ of the minimum round trip time has elapsed from retransmission.

However, when the Eifel Detection Algorithm is used, time stamp information is always appended to an original data segment at a sender device and to an acknowledgement at a receiver device even under good network conditions. This means that the size of both the original data segment and the acknowledgement data segment is increased. The increase in the amount of transmitted data leads to an increase in communication charges where subscribers are charged for communication in proportion to the amount of segments transmitted through a network. Such an undesirable increase in communication charges is likely to become more pronounced where network conditions are good and instances of data retransmission are likely to be small. Clearly, such increases in communication charges are not desirable for users of receiver devices or sender devices.

It is feasible to include time stamp information in reserved bits of a TCP header used at the time of communication instead of adding the information to a data segment. However, existing communication systems do not support such a method, and consequently, sender and receiver devices would need to be significantly modified to employ such a method.

Further, even when the technique of Allman is used, an optimum result of the determination cannot be obtained in a mobile communication environment where data segment delay is pronounced in a wireless section.

SUMMARY

The present invention is envisioned to solve the above problems, and its object is to provide a technique that enables a reliable determination as to whether an acknowledgement received by a sender device is for an original data segment or for a retransmitted data segment. Specifically, the technique described herein does not increase the data amount and requires no redesign of a receiver device and a little redesign of a sender device.

To solve the above problem, the present invention provides a transmission control method for use in a communication network, comprising: assigning sequence information to each data block to be sequentially transmitted from a sender device to a receiver device; transmitting a plurality of data blocks to the receiver device after assigning the sequence information to each of the plurality of data blocks; retransmitting, from among the plurality of data blocks, a data block for which an acknowledgement signal is not received; receiving an acknowledgement signal containing sequence information of an earliest data block that has not been received by the receiver device, from among the plurality of data blocks; and determining whether the acknowledgement signal acknowledges receipt of one of the plurality of data blocks on the basis of sequence information of the retransmitted data block and the sequence information contained in the acknowledgement signal, wherein the transmitting step includes transmitting a data block subsequent to the transmitted plurality of data blocks when it is determined that the acknowledgement signal acknowledges receipt of one of the plurality of data blocks. An example of the data block is a data segment according to TCP. Preferably, the receiver device is a mobile communication terminal performing packet communications via a mobile communication network.

In one preferred embodiment, the transmission control method further comprises a step of storing in a memory storage means sequence information of a data block subsequent to the retransmitted data block, wherein the determination step includes performing the determination by comparing the sequence information stored in the memory storage means with the sequence information contained in the acknowledgement signal. Preferably, it is determined that the acknowledgement signal acknowledges receipt of one of the plurality of data blocks when a data block identified by the sequence information contained in the acknowledgement signal is a data block that follows the data block identified by the sequence information stored in the memory storage means.

In another preferred embodiment of the transmission control method, a number of the plurality of data blocks transmitted in the transmitting step is determined according to a window size defining a number of data blocks that may be transmitted without receiving an acknowledgement; in this case, the retransmitting step includes changing the window size to a minimum size when retransmitting a data block that is not acknowledged within a projected time, and retransmitting a number of data blocks determined according to the changed window size; and the transmitting step includes increasing the window size when it is determined that the acknowledgement signal acknowledges receipt of one of the plurality of data blocks, such that the window size is equal to or larger than that of before the window size was changed to the minimum size in the retransmitting step, and transmitting a number of data blocks determined according to the increased window size.

The present invention further provides a communication device comprising: assignment means for assigning sequence information to each data block to be sequentially transmitted to a receiver device; transmission means for transmitting a plurality of data blocks to the receiver device after assigning the sequence information to each of the plurality of data blocks; retransmission means for retransmitting, from among the plurality of data blocks, a data block for which an acknowledgement signal is not received; receiving means for receiving an acknowledgement signal containing sequence information of an earliest data block that has not been received by the receiver device, from among the plurality of data blocks; and determination means for determining whether the acknowledgement signal acknowledges receipt of one of the plurality of data blocks on the basis of sequence information of the retransmitted data block and the sequence information contained in the acknowledgement signal, wherein the transmission means transmits a data block subsequent to the transmitted plurality of data blocks when it is determined that the acknowledgement signal acknowledges receipt of one of the plurality of data blocks.

In one preferred embodiment, the communication device further comprises memory storage means for storing sequence information of a data block subsequent to the retransmitted data block, wherein the determination means performs the determination by comparing the sequence information stored in the memory storage means with the sequence information contained in the acknowledgement signal. Preferably, the determination means determines that the acknowledgement signal acknowledges receipt of one of the plurality of data blocks when a data block identified by the sequence information contained in the acknowledgement signal is a data block that follows the data block identified by the sequence information stored in the memory storage means.

In another preferred embodiment, a number of the plurality of data blocks transmitted by the transmission means of the communication device is determined according to a window size defining a number of data blocks that may be transmitted without receiving an acknowledgement. In this case, the retransmission means changes the window size to a minimum size when retransmitting a data block that is not acknowledged within a projected time, and retransmits a number of data blocks determined according to the changed window size; and the transmission means increases the window size when it is determined that the acknowledgement signal acknowledges receipt of one of the plurality of data blocks, such that the window size is equal to or larger than that before the window size was changed to the minimum size by the retransmission means, and transmits a number of data blocks determined according to the increased window size.

The present invention further provides a communication system by which the transmission control method is implemented in the above described various embodiments by providing at least two devices with various means which the above communication device comprises.

Further, the present invention provides a program for causing a computer to execute the transmission control method in the above described various embodiments. The program may be stored in various types of recording media such as a magnetic tape, a magnetic disk, a floppy™ disk, an optical recording medium, a magneto-optical recording medium, a DVD (Digital Video Disk), a RAM, and others.

The present invention enables an optimum determination as to whether an acknowledgement received at a sender device pertains to an original data segment or to a retransmitted data segment without increasing the data amount of a data segment. As a result, unnecessary transmission of data segments can be prevented. Also, the present invention requires no redesign of a receiver device and a little redesign of a sender device.

BRIEF DESCRIPTION OF THE DRAWINGS

FIG. 2 is a block diagram showing a configuration of a server device 10 according to the embodiment.

FIG. 3 is a diagram illustrating a data configuration of a header appended to a data segment according to the embodiment.

FIGS. 9A to 9C are a diagram for describing changes in a congestion window according to the second embodiment.

DETAILED DESCRIPTION OF PREFERRED EMBODIMENTS

Hereinafter, preferred embodiments of the present invention will be explained with reference to the attached drawings. To avoid unnecessary description, descriptions of components are not repeated.

A. First Embodiment

Figure 1:
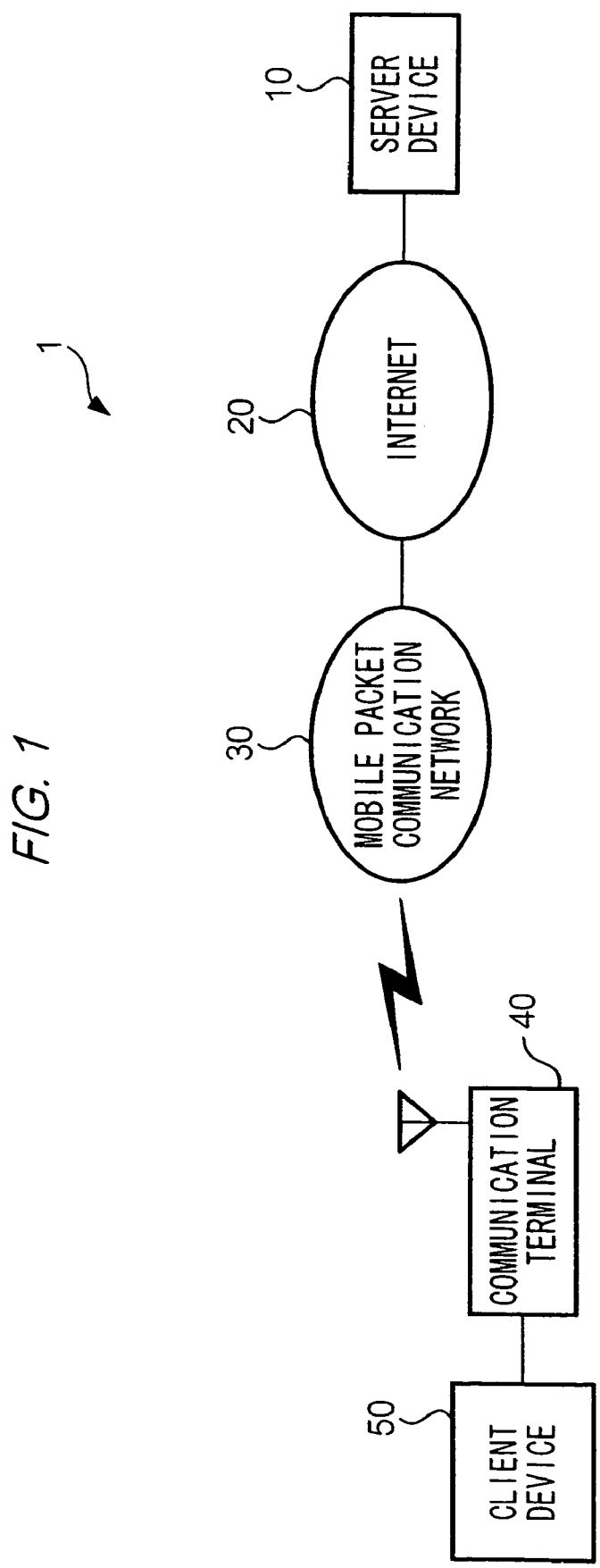
FIG. 1 is a block diagram showing a configuration of a communication system 1 according to a first preferred embodiment of the present invention.

1. Configuration
Configuration of Communication System 1:
FIG. 1 is a block diagram illustrating a configuration of a communication system 1 according to a first embodiment of the present invention.

A communication terminal 40 is connected to a client device 50 and performs communications with client device 50. A mobile packet communication network 30 provides packet communication services to communication terminals 40 served by the network 30. Server device 10 performs packet communication with client device 50 via the Internet 20, mobile packet communication network 30, and communication terminal 40. It is assumed in the present embodiment that TCP (Transmission Control Protocol) is used to perform packet communications, thereby transmitting data segments.

Configuration of Server Device 10:
Next, a description will be given of a configuration of server device 10. Server device 10 is configured in the same way as a standard computer, and therefore, only those components relating to the present invention will be described with reference to FIG. 2.

A CPU 100 executes a program stored in a storage unit 105, thereby controlling each component of server device 10. CPU 100 comprises a timer 100a, which outputs a trigger signal when a predetermined time set by CPU 100 has elapsed. Storage unit 105 comprises a RAM (Random Access Memory) 102, a ROM (Read Only Memory) 103, and a HD (Hard Disk) 104.

ROM 103 stores a program for causing CPU 100 to control data segment transmission. Specifically, when transmitting data to client device 50, CPU 100 divides the data into segments, appends a header to each of the divided data segments, and transmits the segments sequentially to client device 50.

In the present preferred embodiment, CPU 100 uses the above-described sliding window method to transmit data segments to client device 50 based on parameter variables (detailed in a second embodiment) stored in HD 104.

FIG. 3 shows a data configuration of a header appended to a data segment. CPU 100 allocates a sequence number to the "sequence number" field of the header shown in FIG. 3, enters other necessary information into each data area of the header, and appends the header to the data segment.

CPU 100, after transmitting a data segment to client device 50, waits for an acknowledgement indicating that the data segment has been received by client device 50. A data configuration of a header appended to an acknowledgement is the same as that shown in FIG. 3. In the "acknowledgement number" field of the header shown in FIG. 3, a sequence number which client device 50 expects to receive next is set by client device 50.

CPU 100 sets timer 100a to have a predetermined value (hereinafter referred to as "a timeout value") and causes timer 100a to measure an elapsed time for server device 10 to wait for an acknowledgement. In a case where a trigger signal is output from timer 100a, the signal indicating that the timeout value elapsed before an acknowledgement was received, CPU 100 determines that the data segment has not been received by client device 50. CPU 100 then resets a value of timer 100a, and retransmits the data segment. When server device 10 receives an acknowledgement after the retransmission, CPU 100 determines whether the received acknowledgement corresponds to the original data segment or to the retransmitted data segment in such a way as described below.

In the determination process, CPU 100 first compares an acknowledgement number contained in the received acknowledgement (hereinafter referred to as "an acknowledgement number for comparison") with an acknowledgement number which an acknowledgement transmitted in response to the retransmitted segment is expected to have (hereinafter referred to as "an expected acknowledgement number"). It should be noted that the acknowledgement number transmitted in response to the retransmitted data segment is a sequence number of a data segment that is subsequent to the retransmitted data segment. In one embodiment, CPU 100 may record in RAM 102, at the time of retransmission, the sequence number of a data segment that is subsequent to the retransmitted data segment as an expected acknowledgement number. The recorded expected acknowledgement number is read and used for comparison in the case of performing the determination process upon receiving an acknowledgement. Further, as will be detailed in the description of the second embodiment, server device 10 stores a plurality of types of parameter variables and uses them for congestion control. Among such variables, a variable snd_nxt represents a sequence number of a next data segment to be transmitted; and the value of snd_nxt indicates the sequence number of a data segment that is subsequent to the retransmitted data segment. Therefore, the value of snd_nxt may be used as an expected acknowledgement number in performing the determination, instead of recording the expected acknowledgement number in RAM 102.

In a case that the value of the acknowledgement number for comparison is larger than the expected acknowledgement number, it is determined that the acknowledgement corresponds to the original data segment. That is, CPU 100 determines that the original data segment has been received by client device 50, and then transmits a subsequent original data segment.

In a case that the value of the acknowledgement number for comparison is the same as that of the expected acknowledgement number, the determination cannot be made whether the acknowledgement corresponds to the original data segment or to the retransmitted data segment. Therefore, CPU 100 assumes that the acknowledgement pertains to the retransmitted data segment, and then determines whether there is any data segment for retransmission that is subsequent to the retransmitted data segment. In a case that there is such a segment, the subsequent data segment for retransmission is transmitted; and when there is no such a segment, a subsequent original data segment is transmitted.

Configuration of Client Device 50:

Client device 50 has the configuration of a generally used computer, and therefore description will be given only of functions of the device 50 that specifically relate to the present preferred embodiment.

Client device 50, upon receiving a data segment from server device 10, transmits to server device 10 an acknowledgement informing that the data segment has been received. Specifically, a sequence number indicating a sequential position subsequent to the data segment is set as the acknowledgement number contained in the acknowledgement for transmission to server device 10.

It is assumed here that a wireless communication environment deteriorates between communication terminal 40 and mobile packet communication network 30 while client device 50 is performing a packet communication with server device 10. In such a case, client device 50 sequentially receives the data segments transmitted from server device 10 with delay. In a case where an interval from when a first data segment is received until a second data segment is received is shorter than a predetermined time period, an acknowledgement for the second data segment only is transmitted, thereby informing server device 10 that two data segments have been received. Specifically, a sequence number indicating a sequential position that is subsequent to the second data segment is set as the acknowledgement number of the acknowledgement for transmission to server device 10.

2. Operation

Next, an operation of the present preferred embodiment will be described.

Figure 4:
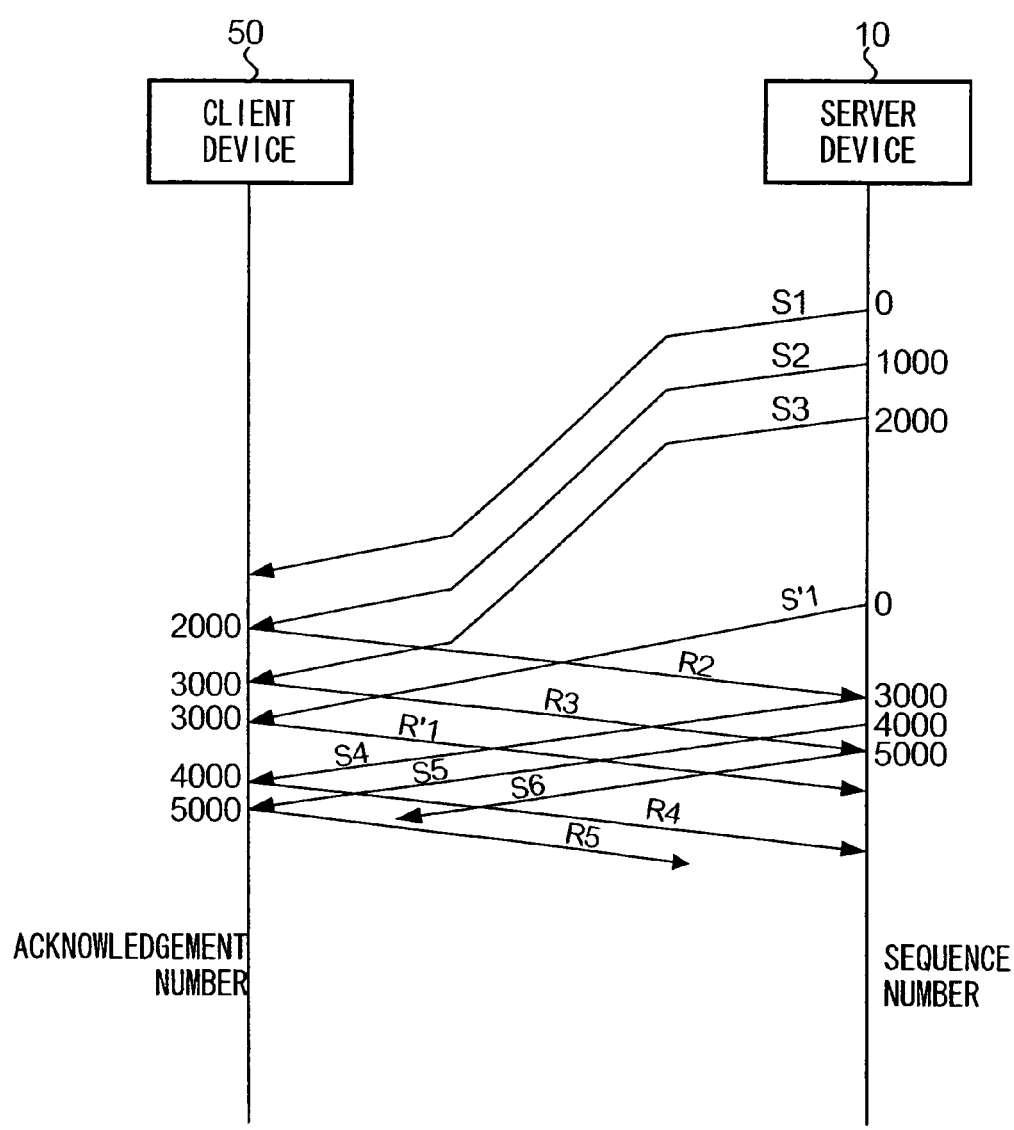
FIG. 4 is a sequence chart illustrating an example of performing a packet communication between server device 10 and a client device 50 according to the embodiment.

FIG. 4 is a sequence chart showing an example case where a packet communication is performed between server device 10 and client device 50. FIG. is a flow chart illustrating operations of transmitting and receiving data segments at server device 10 according to the present embodiment. It is assumed that in the present embodiment, the sliding window method is used to transmit data segments. In the second embodiment, the initial window size is set as three, and the amount of data segments that can be received by client device 50 is sufficiently large relative to the window size set by server device 10. For simplicity, it is assumed that the window size is fixed as three, and that the window size is not increased for congestion control. In a case of a timeout, server device 10 records a window size occurring immediately before the retransmission timeout is detected.

In FIG. 4, data segments having sequence number 0, 1000, and 2000, respectively (original data segments S1, S2, and S3), are transmitted from server device 10 to client device 50.

In the example shown in the figure, a wireless communication environment between communication terminal 40 and mobile packet communication network 30 has deteriorated, and transmission of the original data segments S1, S2, and S3 has been suspended. When the wireless communication environment improves and communication is restored, the original data segments S1, S2, and S3 that have been residing in the network 30 are transmitted to client device 50.

On the other hand, client device 50 sequentially receives original data segments S1, S2, and S3 with a delay. In this example, an interval from when the original data segment is received until the original data segment S2 is received is shorter than a predetermined time, and an acknowledgement having an acknowledgement number 2000 is transmitted to server device 10 as an acknowledgement for the original data segments S1 and S2.

Now, description will be given of operations performed by server device 10 with reference to FIG. 5. In Step S300, CPU 100 of server device 10 transmits the original data segments S1, S2, and S3, and then waits for an acknowledgement transmitted from client device 50 in response to receipt of the original data segment S1. In waiting for the acknowledgement, CPU 100 sets a timeout value at timer 100a to cause timer 100a to measure an elapsed time (Step S301).

CPU 100 then determines whether any acknowledgment is received (Step S302). When it is determined "No" in Step S302, CPU 100 then determines whether a timeout by timer 100a occurs (Step S303). In a case that it is determined "No" in Step S303, the routine returns to Step S302. The determination of Steps S302 and S303 is repeated by CPU 100 before a timeout occurs as far as no acknowledgement is received.

It is further assumed here that the elapsed time reaches a timeout value before the acknowledgement R2 is received because the arrival of the data segments S1 to S3 is delayed. In this case, a trigger signal is output from timer 100a after an elapsed time measured by timer 100a reaches a timeout value without receiving an acknowledgement (Step S302; No, Step S303; Yes). CPU 100 then resets timer 100a, and proceeds to Step S304.

In Step S304, CPU 100 determines that the original data segment S1 has not been received by client device 50, and retransmits a data segment having sequence number 0 (the retransmitted data segment S'1 in FIG. 4) to client device 50. The window size is reduced to a minimum value due to the timeout, and only one data segment is retransmitted here. CPU 100 further sets a timeout value at timer 100a to cause it to measure an elapsed time.

CPU 100 then determines whether any acknowledgment is received (Step S305), and in a case that it is determined "No" in Step S305, CPU 100 then determines whether a timeout by timer 100a occurs (Step S306). When the determination of Step S306 is "No," the routine returns to Step S305. After this, the determination of Steps S305 and S306 is repeated by CPU 100 before a timeout occurs as far as no acknowledgement is received.

It is assumed that CPU 100 subsequently receives the acknowledgment R2 before the timeout value is reached, i.e., before a trigger signal is output from timer 100a, where it is determined "Yes" in Step S305, and the routine proceeds to Step S307.

In Step S307, CPU 100 resets timer 100a. CPU 100 then compares the acknowledgement number 2000 contained in the acknowledgement R2 (the acknowledgement number for comparison) with the expected acknowledgement number 1000 that is expected to be contained in an acknowledgement transmitted in response to receipt of the retransmitted data segment transmitted in Step S304; the expected acknowledgement number having been stored in RAM 102 at the time of the retransmission. Since, in the example, the acknowledgement number for comparison is larger than the expected acknowledgement number, CPU 100 determines that the acknowledgement R2 corresponds to the original data segments S1 and S2. In other words, CPU 100 determines that the original data segments S1 and S2 are received by client device 50 without being lost. As a result, the window size is restored to "three" as of before the timeout by referring to the stored information in RAM 102, and the window slides by the original data segments S1 and S2. As a result, two data segments subsequent to the transmitted data segment S3 can now be transmitted.

In Step S309, CPU 100 of server device 10 transmits two original data segments S4 and S5 that are subsequent to the original data segment S3. In FIG. 4, a process corresponding to Step S309 is shown wherein server device 10 transmits the original data segments S4 and S5 to client device 50. The routine then returns to Step S301, and timer 100a starts measuring an elapsed time.

Subsequently, CPU 100 repeats the determination of Steps S302 and S303 before a timeout occurs as far as no acknowledgement is received.

While server device 10 is performing the above mentioned processes, the original data segment S3 is received by client device 50. Then, an acknowledgement R3 having an acknowledgement number 3000 is transmitted to server device 10 in response to the original data segment S3.

Figure 5:
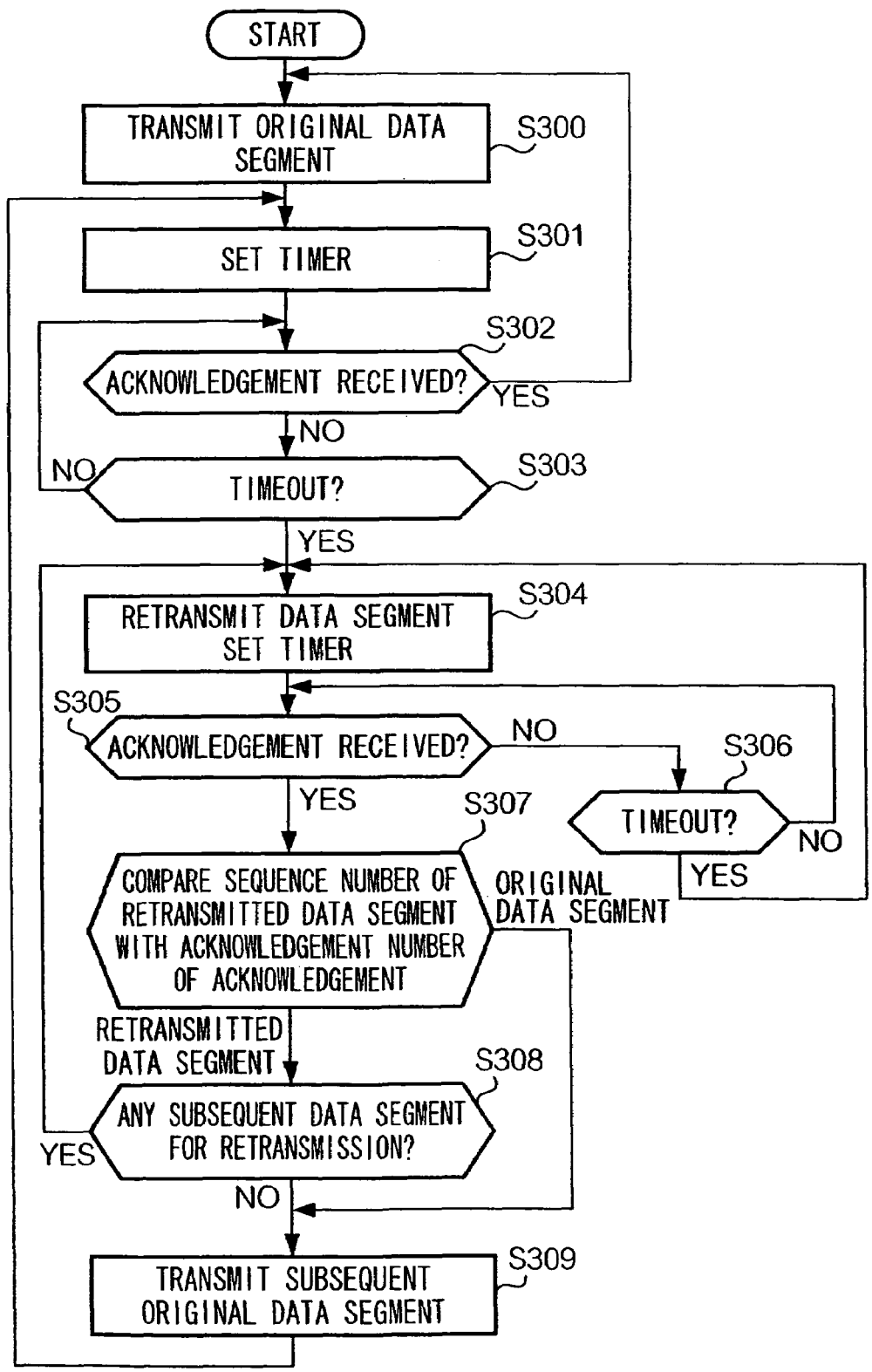
FIG. 5 is a flow chart showing operations of transmitting and receiving data segments at server device 10.

In FIG. 5, when acknowledgement R3 having an acknowledgment number 3000 reaches server device 10, it is determined by CPU 100 of server device 10 "Yes" in Step S302. As a result, the window slides further by one data segment, and server device 10 can now transmit one data segment that is subsequent to the last data segment S5 from among previously transmitted data segments. In Step S300, CPU 100 transmits an original data segment S6 having subsequent sequence number 5000.

In FIG. 4, in a process corresponding to Step S302, server device 10 transmits the original data segment S6 to client device 50.

The foregoing is an explanation of how data segments are transmitted from server device 10 to client device 50.

B. Second Embodiment

Next, description will be given of another example of performing packet communications between server device 10 and client device 50. Hereinafter, a description of the same components as the first embodiment will be omitted. Also, like components are described with like reference numerals being assigned.

1. Configuration
Configuration of Server Device 10:
A description will be given only of those configurations relating to the present embodiment.

ROM 103 of server device 10 stores a program for causing CPU 100 to perform a data segment transmission control process. The process will be described in detail in the following, and it should be noted that those portions that are the same as those of the first embodiment will not be described here.

In the present embodiment, in transmitting data segments to client device 50, CPU 100 performs congestion control in addition to utilizing the sliding window method described in relation to the first embodiment, for controlling a data flow of data segments. Specifically, CPU 100 increases or decreases a window size, i.e., a number of data segments that can be transmitted without acknowledgement. A change in window size is initiated each time receipt of a transmitted data segment is acknowledged. It is to be noted also that ROM 103 stores in advance information on control of congestion window.

Figure 6:
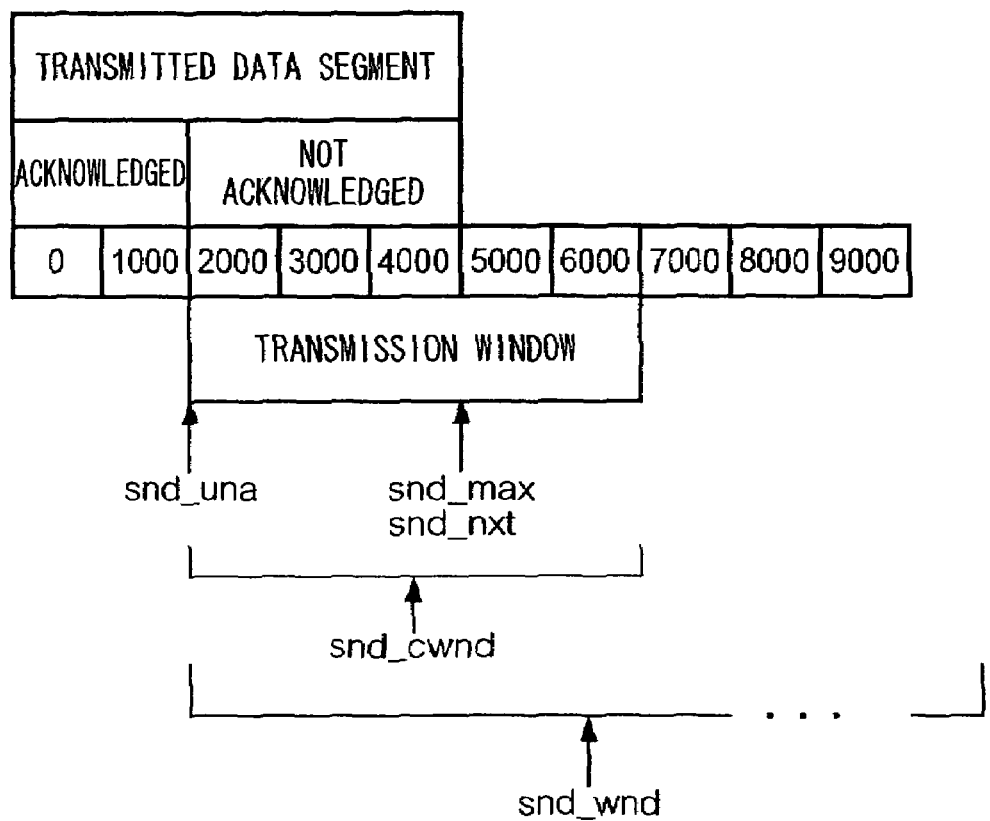
FIG. 6 is a diagram for describing a window according to a second embodiment of the present invention.

In the following description, window congestion control will be detailed. Server device 10 according to the present embodiment stores in HD 104 at least five parameter variables, snd_max, snd_nxt, snd_una, snd_wnd, and snd_cwnd. Congestion control is performed by transmitting a number of data segments identified on the basis of those parameter variables. FIG. 6 is a diagram describing the interrelations of these five parameter variables. snd_max shows a sequence number (sequence number 5000 in FIG. 6) of an original data segment to be transmitted; snd_nxt shows a next sequence number (sequence number 5000 in FIG. 6) of a data segment server device 10 will transmit or retransmit; snd_una shows the least recent unacknowledged sequence number (sequence number 2000 in FIG. 6) among data segments that have already been transmitted.

snd_cwnd shows a number of data segments that may be transmitted by server device 10 without receipt of an acknowledgement for previously transmitted data segments. One segment is represented in a unit called Maximum Segment Size (hereinafter referred to as "MSS"), where the default size of 1 MSS is determined as 1,460 bytes; and snd_cwnd has, for example, 3 MSS as its initial value. CPU 100 of Server device 10 increases a value of snd_cwnd using a "Slow Start" algorithm where a number of data segments transmitted is incremented exponentially until the value reaches a predetermined threshold (e.g., 65,535 bytes) every time an acknowledgement for a transmitted data segment is received; cnd_cwnd is a value controlled by server device 10 and represents a "congestion window size."

In contrast, snd_wnd represents an advertised window size notified from a client device 50; and the value of the advertised window size indicates an available buffer receiving space of client device 50, and is represented in bytes.

CPU 100 of server device 10 determines a minimum of advertised window size (snd_wnd) and congestion window size (snd_cwnd) as a window size for transmission, on the basis of which window control is performed. Consequently, a transmission window size never exceeds an advertised window size, and a number of data segments transmitted to client device 50 never exceeds an available buffer space of client device 50. In the present embodiment, it is assumed that the advertised window size is of a sufficiently larger size than that of a congestion window size; and for the sake of the explanation, a transmission window size is referred to as a "congestion window size."

In the present embodiment, when retransmission timeout is detected, CPU 100 of server device 10 first sets the value of snd_cwnd with 1 MSS, and records in RAM 102 the value of snd_cwnd occurring immediately before the retransmission timeout is detected. CPU 100 substitutes the value of snd_nxt with that of snd_una, and then retransmits a data segment designated by snd_nxt. Each time an acknowledgement is received for a retransmitted data segment, the value set in snd_cwnd is incremented by 1 MSS according to the above described Slow Start algorithm.

In the present embodiment, the determination process (Step S307 of FIG. 5; Step S307 of FIG. 8 in the second embodiment) described in the first embodiment is performed when an acknowledgement is received following data segment retransmission. As a result, in a case where the received acknowledgement corresponds to an original data segment, the congestion window size is restored to that immediately before retransmission. Specifically, the value of the congestion window size is updated with the value of snd_cwnd that has been stored in RAM 102 at the time of detecting the retransmission timeout. At the same time, CPU 100 replaces the value of snd_nxt with the value of snd_max, and the data transmission is started from a data segment designated by snd_nxt.

In the present embodiment, CPU 100 performs the described congestion control, whereby a flow of data as of before the timeout can be quickly recovered.

2. Operation

Figure 7:
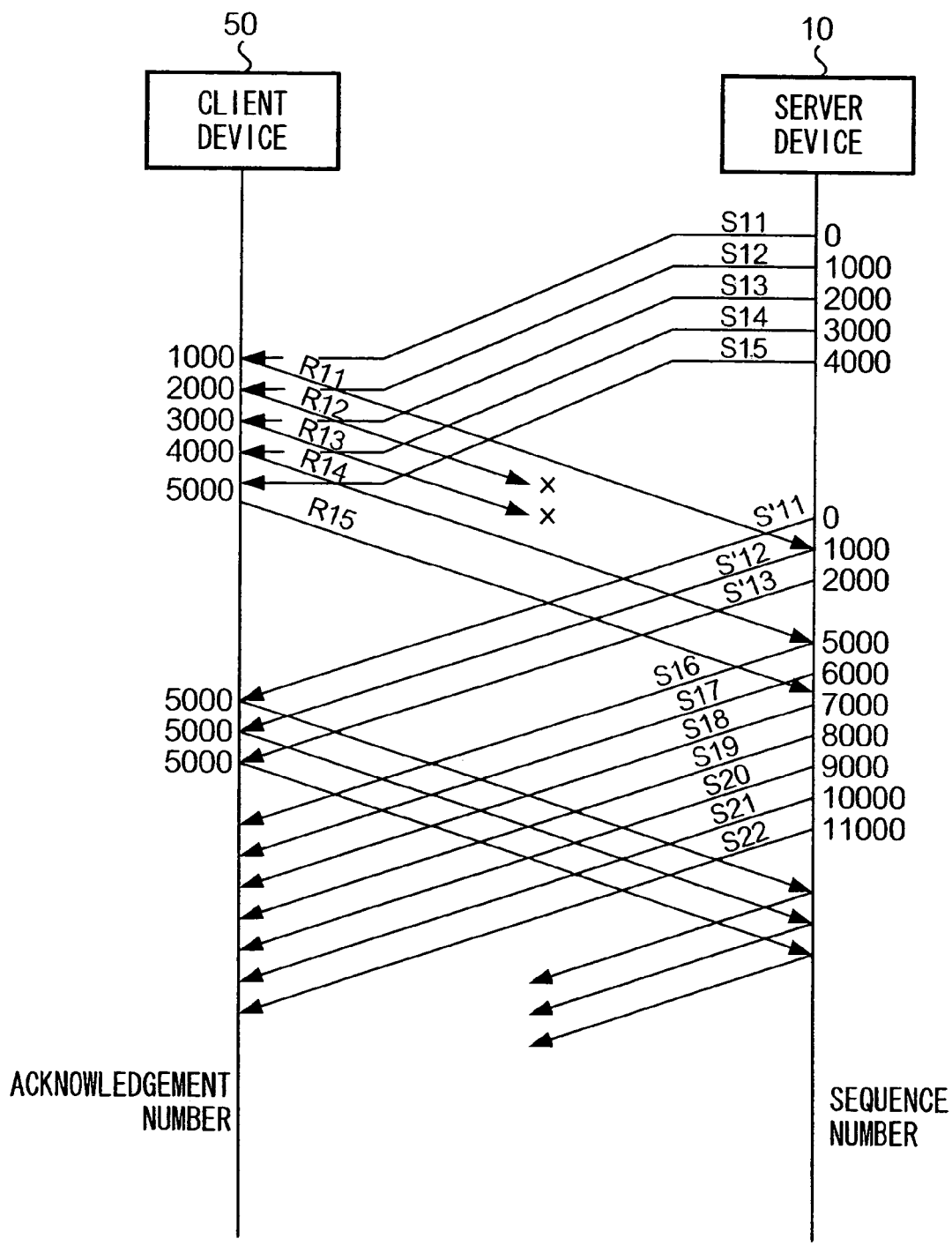
FIG. 7 is a sequence chart showing an example of performing a packet communication between server device 10 and client device 50 according to the second embodiment.
Figure 8:
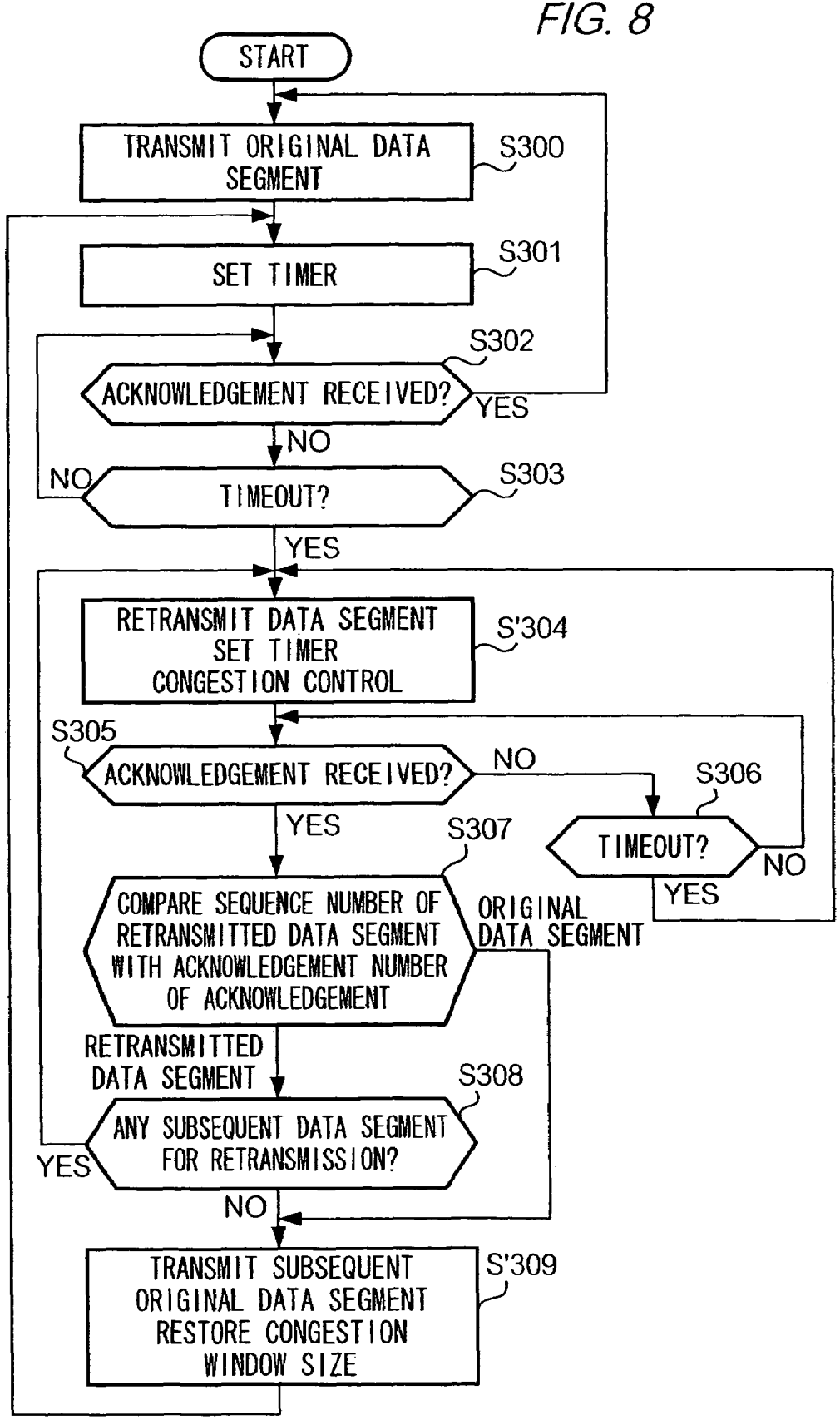
FIG. 8 is a flow chart showing operations of server device 10 of transmitting and receiving data segments according to the second embodiment.
Figure 9B:
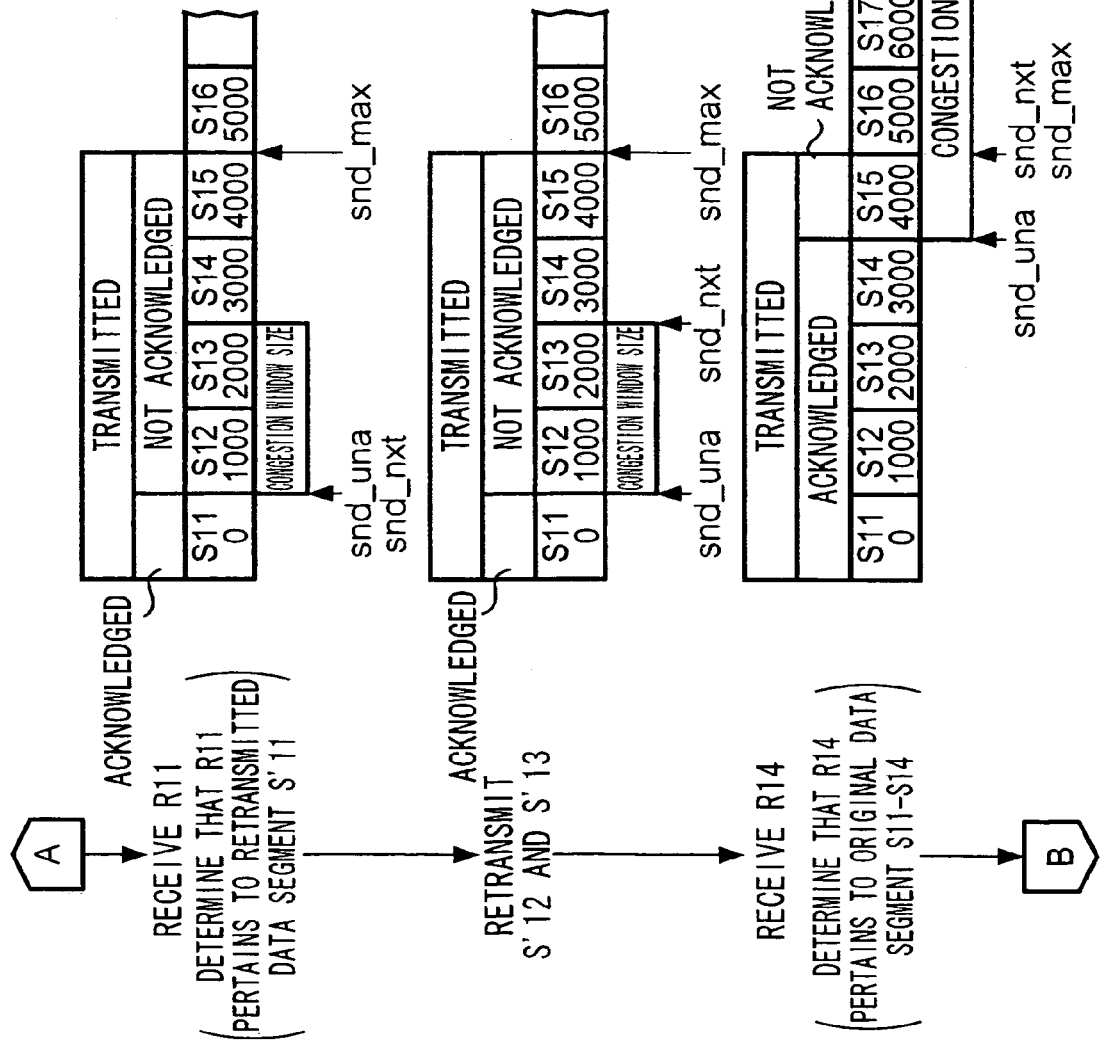
Figure 10:
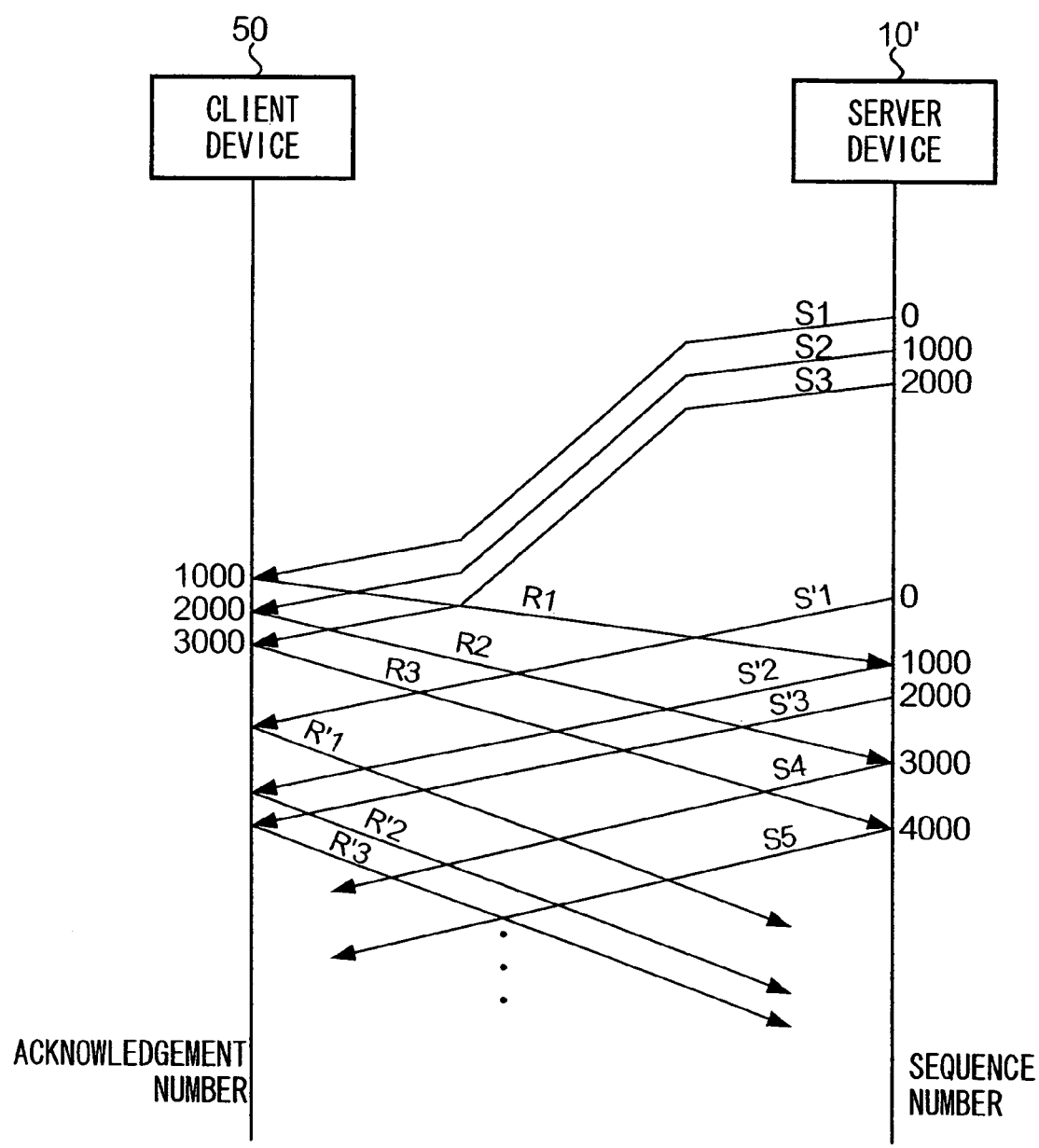
FIG. 10 is a sequence chart showing an example of performing a packet communication between a conventional server device 10' and client device 50.
Figure 11:
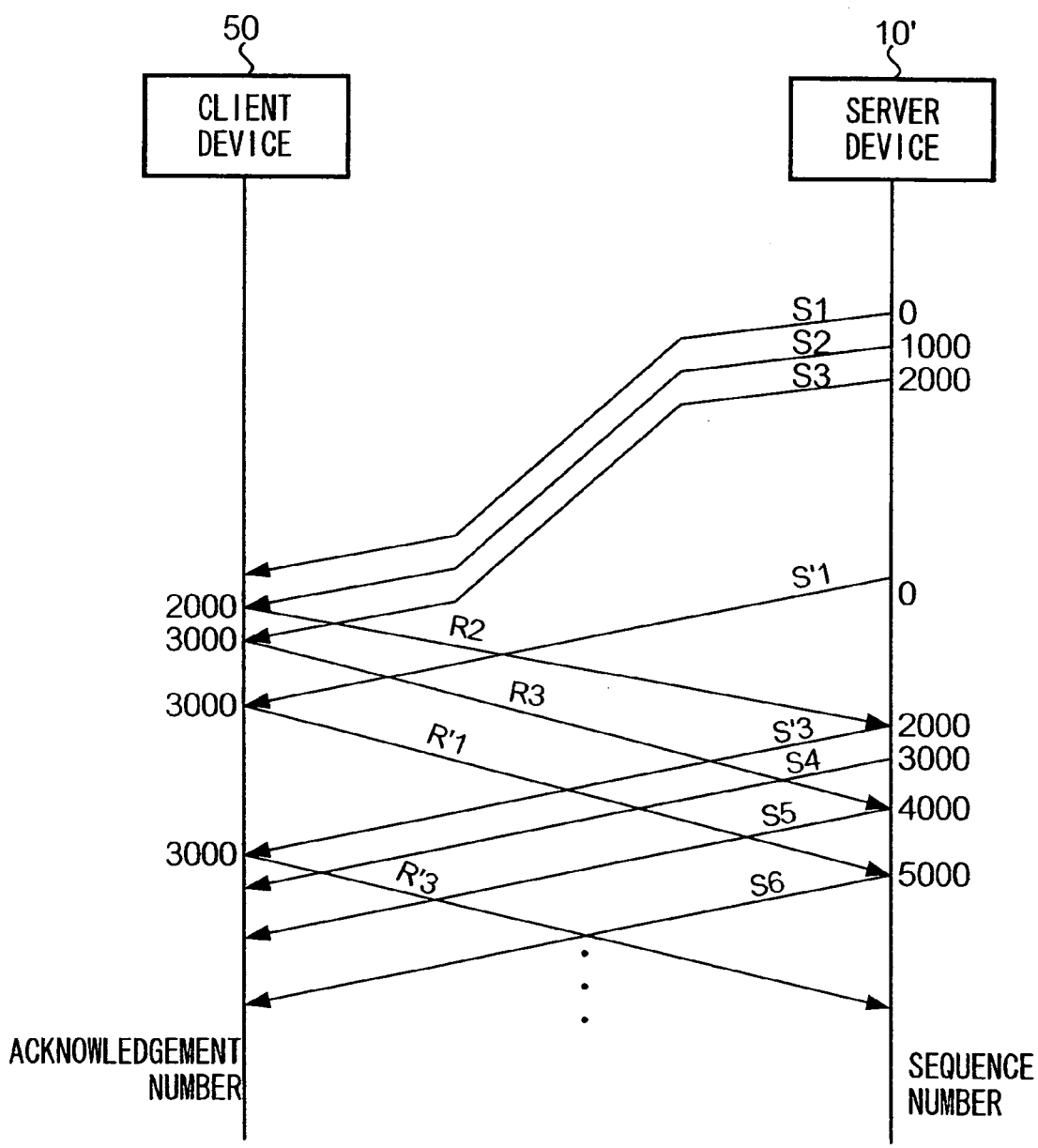
FIG. 11 is a sequence chart showing another example of performing a packet communication between a conventional server device 10' and client device 50.

FIG. 7 is a sequence chart showing another example of performing packet communication between server device 10 and client device 50. FIG. 8 is a flow chart showing transmission and receipt operations of data segments by server device 10 according to the present embodiment. FIGS. 9A to 9C are schematic diagrams showing changes in the congestion window size. It is to be noted that the same reference numerals denote the same steps described in the first embodiment, and description thereof is therefore omitted.

In FIG. 7, data segments having sequence number 0, 1000, 2000, 3000, and 4000, respectively, (original data segments S11, S12, S13, S14, S15) are transmitted from server device 10 to client device 50. The congestion window size snd_cwnd applied at this time is 5 MSS. As shown in FIG. 9A, the least recent unacknowledged sequence number 0 (S11) is set as a value of snd_una. The next original sequence number to be transmitted 5000 is set as snd_max; and sequence number 5000 of a next data segment to be transmitted (S16) is set as snd_nxt.

In the example shown in the figure, wireless communication between terminal 40 and mobile packet communication network 30 deteriorates, as a result of which transmission of the original data segments S11 to S15 is suspended. When the wireless conditions improve and communication is restored, the original data segments S11 to S15 are successively transmitted to client device 50. Client device 50 then successively receives the original data segments S 11 to S15 with significant delay.

Upon receiving the original data segment S11, client device 50 transmits an acknowledgement R11 having acknowledgement number 1000 as a response to receipt of the original data segment S11.

It is further assumed that, due to the delayed reception of the data segments S11 to S15, a timeout occurred at server device 10 before receipt of acknowledgement R11. That is, CPU 100 receives no acknowledgement even if a trigger signal is output from timer 10*a* after the timeout value is exceeded after Step S301 (Step S302; No, Step S303; Yes). As shown in FIG. 9A, upon timeout, server device 10 updates the congestion window size with 1 MSS, and replaces the value of snd_nxt with the value of snd_una.

Next in Step S'304, CPU 100 determines that the original data segment S11 has not been received by client device 50. CPU 100 then retransmits to client device 50 a data segment (a retransmitted data segment S'11 in FIG. 7) having sequence number 0 designated by the value of snd_nxt. CPU 100 also sets a timeout value with timer 100*a* to cause timer 100*a* to measure the timeout value.

Subsequently, CPU 100 of server device 10 receives the acknowledgement R11 before a trigger signal is output from timer 100*a* before the timer expires, and the routine then proceeds to Step S307.

Next, operation of server device 10 corresponding to the above steps will be described with reference to FIG. 8.

In Step S300, CPU 100 of server device 10 transmits the five original data segments S11-S15 with the congestion window size of 5 MSS. CPU 100 then performs the processes of S301 to S303, and the routine then proceeds to Step S'304. In Step S'304, CPU 100 changes the congestion window size to 1 MSS for congestion control, and retransmits a data segment having sequence number 0 (retransmitted data segment S'11). Subsequently, server device 10 receives the acknowledgement R11 (Step S305; Yes), and the process of Step S307 is performed.

In Step S307, CPU 100 compares the acknowledgement number 1000 (acknowledgement number for comparison) contained in acknowledgement R11 with expected acknowledgement number (1000) for the retransmitted data segment transmitted in Step S304. The value of the expected acknowledgement number may be obtained by referring to the value of snd_nxt; and alternatively, the stored information of RAM 102 may be referred to as in the first embodiment. In this case, the acknowledgement number for comparison and the expected acknowledgement number are identical; and it is not possible to determine whether the acknowledgement R11 corresponds to the original data segment S11 or the retransmitted data segment. Therefore, CPU 100 estimates that the acknowledgement R11 corresponds to the retransmitted data segment S'11. That is, it is determined that the original data segment S11 has not been received by client device 50 due to loss of a data segment, and the routine proceeds to Step S308.

In Step S308, it is determined whether any data segment for retransmission exists subsequent to the retransmitted data segment S'11. The value of snd_nxt at this time is the sequence number 1000 of a transmitted data segment S12 (see FIG. 9A). Therefore, it is determined that a data segment for retransmission does exist, and the routine then proceeds to Step S'304. In Step S'304, the congestion window size is increased to 2 MSS since the acknowledgement R11 is received, whereby congestion control is performed. Two data segments having subsequent sequence numbers 1000 and 2000 (S'12 and S'13) are then retransmitted. CPU 100 sets timer 100a at the same time.

In FIG. 7, retransmitted data segments S'12 and S'13 are transmitted from server device 10.

On the other hand, client device 50 transmits acknowledgements having acknowledgement numbers 2000, 3000, and 4000, respectively, in response to receipt of the original data segments S12, S13, and S14. It is assumed here that the acknowledgements R12 and R13 have been lost due to a deterioration in wireless communication. As a result, the acknowledgement R14 is transmitted to server device 10.

In FIG. 8, CPU 100 receives the acknowledgement R14 (Step S305; Yes) before an elapsed time measured by timer 100a exceeds a timeout value. The routine then proceeds to Step S307.

In Step S307, CPU 100 compares acknowledgement number 4000 (acknowledgement number for comparison) contained in the acknowledgement R14 with an expected acknowledgement number for a retransmitted data segment S'13 (3000). Since the acknowledgement number for comparison is larger than the expected acknowledgement number, it is determined that the original data segments S11 to S14 have been safely received by client device 50 without being lost. The routine then proceeds to Step S'309.

In Step S'309, CPU 100 refers to the stored information in RAM 102 and restores the congestion window size to that existing immediately before the retransmission timeout. Specifically, the congestion window size is restored to 5 MSS stored in RAM 102, and is further incremented by 1 MSS as a result of receipt of the acknowledgement R14, thus resulting in 6 MSS in total. As shown in FIG. 9B, the value of snd_nxt is replaced with the value of snd_max. Further, since the original data segment S15 has not been acknowledged, the value of snd_una is changed to 4000, which is the sequence number of the original data segment S15. Provided that the congestion window is 6 MSS starting from the value of snd_una, 5 original data segments S16 to S20 that have not been transmitted and that are under the congestion window are transmitted sequentially.

In FIG. 8, the original data segments S16, S17, S18, S19, and S20 having sequence numbers 5000, 6000, 7000, 8000, and 9000, respectively, are transmitted from server device 10 to client device 50.

While transmitting these original data segments, CPU 100 receives an acknowledgement R15. CPU 100 then determines that the original data segment S15 has been received by client device 50, and changes the value of snd_una to the sequence number 5000 corresponding to the original data segment S16. The congestion window size is incremented by 1 MSS, resulting in 7 MSS (refer to FIG. 9C). As a result, subsequent original data segments S21 and S22 can be transmitted, and these data segments are transmitted from server device 10 to client device 50.

The configuration described above prevents unnecessary retransmission of a data segment, and also any unnecessary reduction in a transmission rate of data segments. Further, since a transmission rate is restored to a value determined from that existing immediately before a retransmission timeout, a reduced transmission rate caused by unnecessary retransmission can be quickly corrected.

C. MODIFICATIONS

In the foregoing, a preferred embodiment of the present invention has been described. The present invention may be implemented in various other embodiments without departing from the main characteristic of the invention. Following are example modifications.

In the above preferred embodiments, a packet communication is performed according to TCP. However, the present invention may be applied to a communication protocol for packet communications other than TCP if it performs retransmission control of a data block or a data segment. In this case, data segments may be transmitted using a window that is similar to a sliding window method used in TCP.

A separate server device may replace the function of determination performed by server device 10 as to which data segment corresponds to a received acknowledgement. In this case, server device 10, upon receiving an acknowledgement after transmitting a data segment for retransmission, inquires at a separate server device whether the acknowledgement corresponds to an original data segment or to a retransmitted data segment. The separate service device performs the determination and transmits a result of the determination to server device 10. Server device 10 is then able to determine which data segment corresponds to the acknowledgement on the basis of the transmitted result of the determination.

In the above embodiment, client device 50 performs a packet communication with server device 10 through communication terminal 40. However, client device 50 may comprise a wireless communication function and perform a packet communication with server device 10 through mobile packet communication network 30, the Internet 20, and not through communication terminal 40.

The invention claimed is:

1. A transmission control method for use in a communication network, comprising:
    assigning sequence information to each data block to be sequentially transmitted from a sender device to a receiver device;
    transmitting a plurality of original data blocks to said receiver device after assigning said sequence information to each of said plurality of original data blocks;
    retransmitting, from among said plurality of original data blocks, a data block for which an acknowledgement signal is not received;
    receiving an acknowledgement signal containing sequence information of a data block that has not been received by said receiver device;
    determining which of said plurality of original data blocks or said retransmitted data block of one of said plurality of original data blocks said received acknowledgement signal acknowledges, the determination being based on said sequence information contained in said received acknowledgement signal and at least one of said sequence information contained in at least one of the plurality of original data blocks or sequence information contained in said retransmitted data block; and transmitting a data block subsequent to said transmitted plurality of original data blocks when it is determined that said acknowledgement signal acknowledges receipt of one of said plurality of original data blocks; otherwise retransmitting an original data block subsequent to a data block corresponding to said received acknowledgement signal, when it is determined that said acknowledgement signal acknowledges receipt of a retransmitted data block of one of said plurality of original data blocks and when it is determined that there is a subsequent data block for retransmission.

2. A transmission control method according to claim 1, wherein a number of said plurality of data blocks transmitted in said transmitting step is determined according to a window size defining a number of data blocks that may be transmitted without receiving an acknowledgement;

wherein said retransmitting step includes changing said window size to a minimum size when retransmitting a data block that is not acknowledged within a projected time, and retransmitting a number of data blocks determined according to the changed window size; and wherein said transmitting step includes increasing said window size when it is determined that said acknowledgement signal acknowledges receipt of one of said plurality of data blocks, such that said window size is equal to or larger than that of before said window size was changed to said minimum size in said retransmitting step, and transmitting a number of data blocks determined according to the increased window size.

3. A communication device comprising:

assignment means for assigning sequence information to each data block to be sequentially transmitted to a receiver device;

transmission means for transmitting a plurality of original data blocks to said receiver device after assigning said sequence information to each of said plurality of original data blocks;

retransmission means for retransmitting, from among said plurality of original data blocks, a data block for which an acknowledgement signal is not received;

receiving means for receiving an acknowledgement signal containing sequence information of a data block that has not been received by said receiver device;

determination means for determining which of said plurality of original data blocks or said retransmitted data block of one of said plurality of original data blocks said received acknowledgement signal acknowledges, the determination being based on said sequence information contained in said received acknowledgement signal and at least one of said sequence information contained in at least one of the plurality of original data blocks or sequence information contained in said retransmitted data block; and subsequent transmission means for transmitting a data block subsequent to said transmitted plurality of original data blocks when it is determined that said acknowledgement signal acknowledges receipt of one of said plurality of original data blocks; otherwise for retransmitting an original data block subsequent to a data block corresponding to said received acknowledgement signal when it is determined that said acknowledgement signal acknowledges receipt of a retransmitted data block of one of said plurality of original data blocks and when it is determined that there is a subsequent data block for retransmission.

4. A communication device according to claim 3, further comprising memory storage means for storing sequence information of a data block subsequent to said retransmitted data block, wherein said determination means performs said determination by comparing said sequence information stored in said memory storage means with said sequence information contained in said acknowledgement signal.

5. A communication device according to claim 4, wherein said determination means determines that said acknowledgement signal acknowledges receipt of one of said plurality of data blocks when a data block identified by said sequence information contained in said acknowledgement signal is a data block that follows said data block identified by said sequence information stored in said memory storage means.

6. A communication device according to any one of claims 3-5, wherein a number of said plurality of data blocks transmitted by said transmission means is determined according to a window size defining a number of data blocks that may be transmitted without receiving an acknowledgement;

wherein said retransmission means changes said window size to a minimum size when retransmitting a data block that is not acknowledged within a projected time, and retransmits a number of data blocks determined according to the changed window size; and wherein said transmission means increases said window size when it is determined that said acknowledgement signal acknowledges receipt of one of said plurality of data blocks, such that said window size is equal to or larger than that before said window size was changed to said minimum size by said retransmission means, and transmits a number of data blocks determined according to the increased window size.

7. A communication system comprising:

assignment means for assigning sequence information to each data block to be sequentially transmitted from a sender device to a receiver device;

transmission means for transmitting a plurality of original data blocks to said receiver device after assigning said sequence information with each of said plurality of original data blocks;

retransmission means for retransmitting, from among said plurality of original data blocks, a data block for which an acknowledgement is not received;

receiving means for receiving an acknowledgement signal containing sequence information of a data block that has not been received by said receiver device;

determination means for determining which of said plurality of original data blocks or said retransmitted data block of one of said plurality of original data blocks said received acknowledgement signal acknowledges, the determination being based on said sequence information contained in said received acknowledgement signal and at least one of said sequence information contained in at least one of the plurality of original data blocks or sequence information contained in said retransmitted data block; and subsequent transmission means for transmitting a data block subsequent to said transmitted plurality of original data blocks when it is determined that said acknowledgement signal acknowledges receipt of one of said plurality of original data blocks; otherwise for retransmitting an original data block subsequent to a data block corresponding to said received acknowledgement signal when it is determined that said acknowledgement signal acknowledges receipt of a retransmitted data block of one of said plurality of original data blocks and when it is determined that there is a subsequent data block for retransmission.

8. A program product for causing a computer to execute:
a process of assigning sequence information to each data block to be sequentially transmitted from a sender device to a receiver device;
a process of transmitting a plurality of original data blocks to said receiver device after assigning said sequence information to each of said plurality of original data blocks;
a process of retransmitting, from among said plurality of original data blocks, a data block for which an acknowledgement signal is not received;
a process of receiving an acknowledgement signal containing sequence information of a data block that has not been received by said receiver device;
a process of determining which of said plurality of original data blocks or said retransmitted data block of one of said plurality of original data blocks said received acknowledgement signal acknowledges, the determination being based on said sequence information contained in said received acknowledgement signal and at least one of said sequence information contained in at least one of the plurality of original data blocks or sequence information contained in said retransmitted data block; and
a process of transmitting a data block subsequent to said transmitted plurality of original data blocks when it is determined that said acknowledgement signal acknowledges receipt of one of said plurality of original data blocks; otherwise retransmitting an original data block subsequent to a data block corresponding to said received acknowledgement signal when it is determined that said acknowledgement signal acknowledges receipt of a retransmitted data block of one of said plurality of original data blocks and when it is determined that there is a subsequent data block for retransmission.

9. A transmission control method according to claim 1, wherein said received acknowledgement signal comprises a first acknowledgement signal received after the retransmitting of the data block; and
wherein determining whether said acknowledgement signal acknowledges receipt of one of said plurality of original data blocks or receipt of a retransmitted data block of one of said plurality of original data blocks comprises comparing said sequence information of said retransmitted data block with said sequence information contained in said received acknowledgement signal.

10. A transmission control method according to claim 9, wherein if said sequence information of said retransmitted data block is equal to said sequence information contained in said received acknowledgement signal, it is determined that said acknowledgement signal acknowledges receipt of the retransmitted data block of one of said plurality of original data blocks.

11. A transmission control method according to claim 9, wherein if said sequence information of said retransmitted data block is not equal to said sequence information contained in said received acknowledgement signal, it is determined that said acknowledgement signal acknowledges receipt of one of said plurality of original data blocks.

12. A communication device according to claim 3, wherein said received acknowledgement signal comprises a first acknowledgement signal received after the retransmitting of the data block; and
wherein the determination means determines whether said acknowledgement signal acknowledges receipt of one of said plurality of original data blocks or receipt of the retransmitted data block of one of said plurality of original data blocks comprises by comparing said sequence information of said retransmitted data block with said sequence information contained in said received acknowledgement signal.

13. A communication device according to claim 12, wherein if said sequence information of said retransmitted data block is equal to said sequence information contained in said received acknowledgement signal, the determination means determines that said acknowledgement signal acknowledges receipt of the retransmitted data block of one of said plurality of original data blocks.

14. A communication device according to claim 12, wherein if said sequence information of said retransmitted data block is not equal to said sequence information contained in said received acknowledgement signal, the determination means determines that said acknowledgement signal acknowledges receipt of one of said plurality of original data blocks.

15. A communication system according to claim 7, wherein said received acknowledgement signal comprises a first acknowledgement signal received after the retransmitting of the data block; and
wherein the determination means determines whether said acknowledgement signal acknowledges receipt of one of said plurality of original data blocks or receipt of the retransmitted data block of one of said plurality of original data blocks comprises by comparing said sequence information of said retransmitted data block with said sequence information contained in said received acknowledgement signal.

16. A communication system according to claim 15, wherein if said sequence information of said retransmitted data block is equal to said sequence information contained in said received acknowledgement signal, the determination means determines that said acknowledgement signal acknowledges receipt of the retransmitted data block of one of said plurality of original data blocks.

17. A communication system according to claim 15, wherein if said sequence information of said retransmitted data block is not equal to said sequence information contained in said received acknowledgement signal, the determination means determines that said acknowledgement signal acknowledges receipt of one of said plurality of original data blocks.

18. A program product according to claim 8, wherein said received acknowledgement signal comprises a first acknowledgement signal received after the process of retransmitting the data block; and
wherein the process of determining whether said acknowledgement signal acknowledges receipt of one of said plurality of original data blocks or receipt of a retransmitted data block of one of said plurality of original data blocks comprises comparing said sequence information of said retransmitted data block with said sequence information contained in said received acknowledgement signal.

19. A program product according to claim 18, wherein if said sequence information of said retransmitted data block is equal to said sequence information contained in said received acknowledgement signal, it is determined that said acknowledgement signal acknowledges receipt of the retransmitted data block of one of said plurality of original data blocks.

20. A program product according to claim 18, wherein if said sequence information of said retransmitted data block is not equal to said sequence information contained in said received acknowledgement signal, it is determined that said acknowledgement signal acknowledges receipt of one of said plurality of original data blocks.

\* \* \* \* \*

UNITED STATES PATENT AND TRADEMARK OFFICE
CERTIFICATE OF CORRECTION

PATENT NO. : 7,505,412 B2 Page 1 of 1
APPLICATION NO. : 10/744960
DATED : March 17, 2009
INVENTOR(S) : Motoharu Miyake et al.

It is certified that error appears in the above-identified patent and that said Letters Patent is hereby corrected as shown below:

On the Title Page

Item (75), replace "Yokosuka" with --Yokosuka-shi--.

Item (75), replace "Yokohama" with --Yokohama-shi--.

Item (75), replace "Kunitachi" with --Kunitachi-shi--.

Signed and Sealed this

Fourth Day of August, 2009

JOHN DOLL
*Acting Director of the United States Patent and Trademark Office*